United States Patent [19]

Fachini et al.

[11] Patent Number: 4,553,378
[45] Date of Patent: Nov. 19, 1985

[54] ON BOARD COTTON MODULE SYSTEM FOR COTTON HARVESTING MACHINES

[75] Inventors: Robert M. Fachini, Naperville; Jesse H. Orsborn, Clarendon Hills, both of Ill.

[73] Assignee: J. I. Case Company, Racine, Wis.

[21] Appl. No.: 571,622

[22] Filed: Jan. 17, 1984

[51] Int. Cl.⁴ ............................................. A01D 46/08
[52] U.S. Cl. ...................................... 56/16.6; 56/341; 100/145
[58] Field of Search ................... 56/16.6, 30, 28, 341, 56/344; 100/145, 150

[56] References Cited

U.S. PATENT DOCUMENTS

| | | | |
|---|---|---|---|
| 713,791 | 11/1902 | Orman | 100/145 |
| 2,696,777 | 12/1954 | Sutch | 56/341 |
| 3,412,532 | 11/1968 | Nickla | 56/344 |
| 3,466,857 | 9/1969 | Gaul et al. | 56/30 |
| 3,531,004 | 9/1970 | Gaul et al. | 214/147 |
| 3,556,327 | 1/1971 | Garrison | 214/522 |
| 3,691,741 | 9/1972 | White et al. | 56/344 |
| 3,733,798 | 5/1973 | Garrison | 56/350 |
| 3,757,687 | 9/1973 | Brooks et al. | 100/270 |
| 3,779,158 | 12/1973 | Adee et al. | 100/250 |
| 3,842,730 | 10/1974 | White et al. | 100/245 |
| 3,842,732 | 10/1974 | Anderson | 100/270 |
| 3,847,072 | 11/1974 | Garrison | 100/35 |
| 3,886,719 | 6/1975 | Garrison et al. | 56/344 |
| 3,892,173 | 7/1975 | Hall | 100/150 |
| 3,934,394 | 1/1976 | Garrison | 56/344 |
| 4,169,411 | 10/1979 | Lutz et al. | 100/255 |

OTHER PUBLICATIONS

John Deere, publication A-29-81-12, Cotton Pickers and Strippers, pp. 21 and 35.

Primary Examiner—Jay N. Eskovitz
Attorney, Agent, or Firm—Dressler, Goldsmith, Shore, Sutker & Milnamow, Ltd.

[57] ABSTRACT

A cotton harvesting machine is provided with an on board cotton module maker. The module maker is capable of operating simultaneously with the harvesting of cotton by the harvesting machine.

9 Claims, 7 Drawing Figures

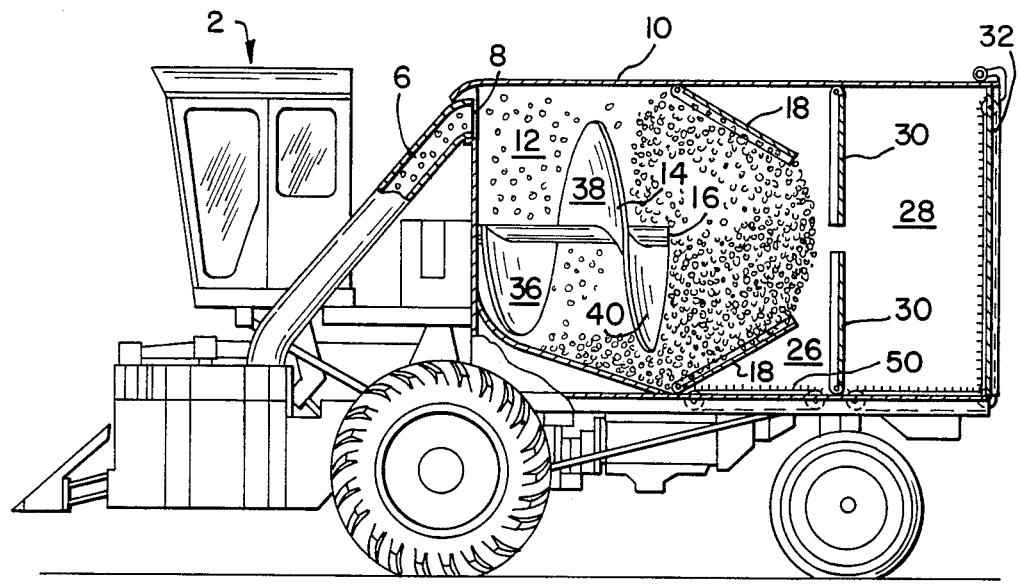
FIG_3_
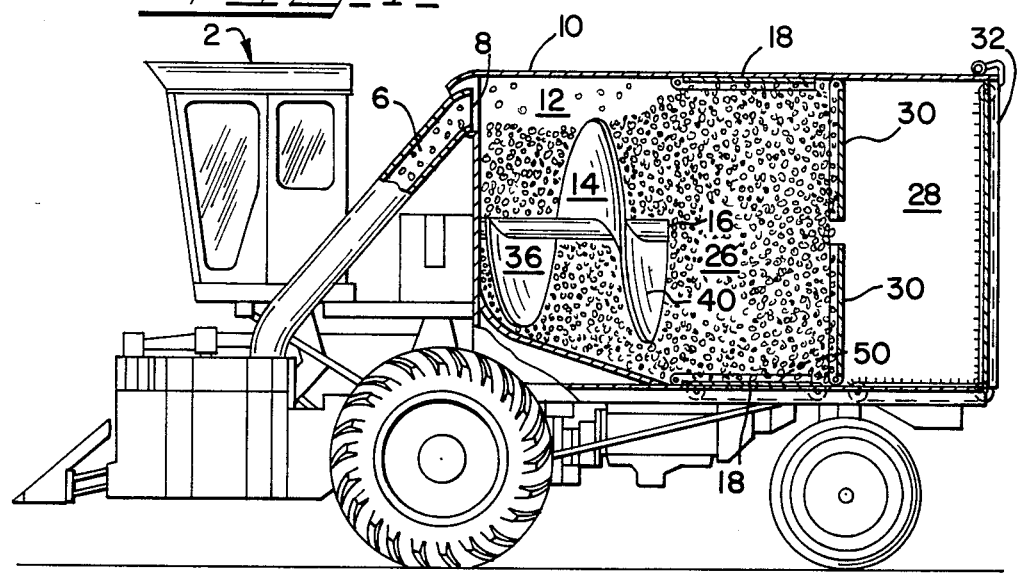
FIG_4_

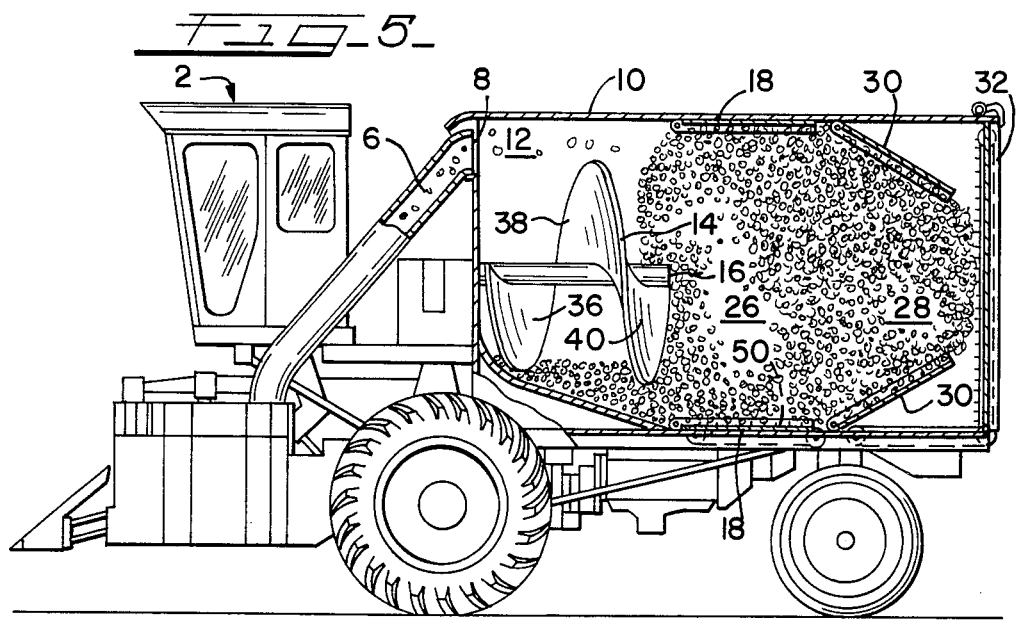
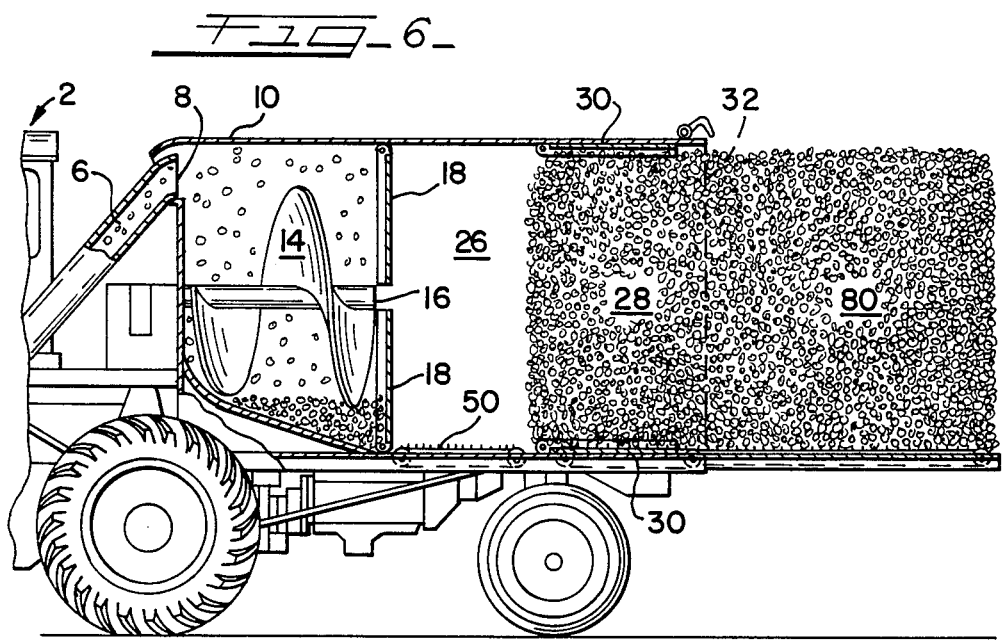

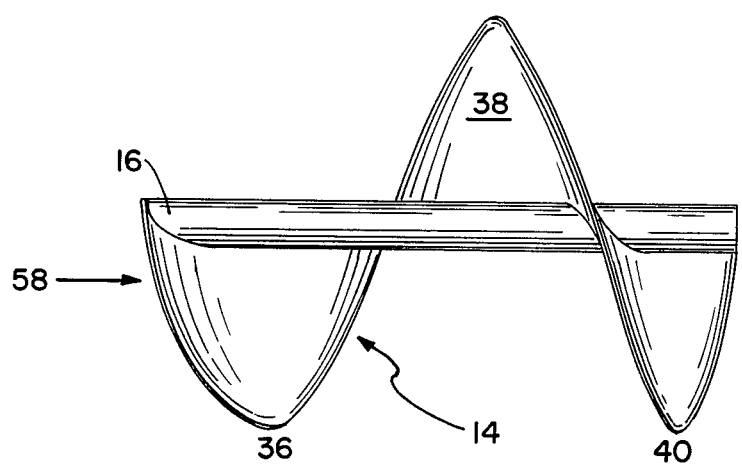

4,553,378

ON BOARD COTTON MODULE SYSTEM FOR COTTON HARVESTING MACHINES

BACKGROUND OF THE INVENTION

Field of the Invention

This invention pertains to cotton harvesting machines. The cotton harvesting machines may be pickers which actually harvest the lint from the cotton boll or may be cotton strippers which harvest the boll itself.

Presently the typical method of producing cotton modules is a two-step process. The first step is driving a cotton harvesting machine through the cotton fields to harvest the cotton lint or cotton bolls. The harvesting machine is usually comprised of a mobile wheeled frame with a harvesting means being mounted adjacent the ground. Also mounted on the frame is a receptacle (commonly referred to as a basket) for holding the harvested cotton. Usually a pneumatic conveyor will transport the cotton from the harvesting means to the basket.

When the basket is filled to capacity, the cotton harvesting machine is forced to cease operating until the basket is unloaded. The harvesting machine may dump into a wagon or "boll buggy." The usual process is to dump into a cotton module maker. The cotton module maker is typically a rectangular box which is open topped and floorless. Above the rectangular box is a sliding piston which by reciprocal motion compresses the harvested cotton into a module. The module must be dense enough to be self-supporting. The module is then placed on a module trailer, for shipment to a cotton gin. At the cotton gin seed and other foreign matter is removed from the harvested cotton.

The above methods have several disadvantages. The use of cotton wagons to transport cotton to the gin is expensive due to the volume of the loose stack of cotton. A disadvantage of using a module maker is that three pieces of capital equipment must be acquired namely, the cotton harvesting machine and the cotton module maker and the module trailer. A disadvantage of both wagons and module makers is that during the time of the dumping operation, the cotton harvesting machine cannot be continually harvesting the cotton. If by chance, a module maker or wagon is not available, the cotton harvesting machine is forced out of operation. Operation may not start back up until a cotton wagon or module builder is again available.

The rows of cotton fields often extend for lengths of a mile or more. Often the harvesting machine will fill to capacity before finishing up a row. At that point in time the harvesting machine operator must leave the row and dump along a service road, or dump into a wagon brought out into the field. If the machine leaves the row to dump, valuable harvesting time is wasted. If a wagon is brought out for unloading, crop damage is likely to occur. When the harvesting machine is partially filled after finishing a row, the operator may be forced to stop and dump to avoid filling up the basket midway through the next row. Another disadvantage of the prior dumping system is that most harvesting machines must either raise the basket or pivot the basket upward. The above unloading operation raises the center of gravity of the machine, providing for increased instability. To overcome the above and other disadvantages the present invention is brought forth.

The present invention is a cotton harvesting machine with an onboard cotton module builder system. The present invention basically comprises a mobile wheeled frame with cotton harvesting means mounted thereon adjacent to the ground. After the cotton is harvested by the harvesting means, the cotton is transported to a receptacle via a conveyor system. Mounted within the receptacle is a means for compression for compressing the harvested cotton into a self-supporting module. The means for compression is sometimes referred to as a module builder. The module builder may be programmed to operate continuously as the cotton harvesting machine is operating, or may be programmed to operate automatically upon filling of the basket, or by operator command. One of the advantages of the present invention is that cotton modules may be customized in length, thereby tailoring the size of the cotton module to the module trailer used for transporting the modules to cotton gins.

It is an object of the present invention to provide an apparatus which can produce a self-supporting stack, from light dry crop materials, which have large resistance to compaction, such as cotton.

It is an object of the present invention to provide a cotton harvesting machine with its own cotton module builder. It is an object of the present invention to provide a cotton harvesting machine which may harvest cotton over longer row lengths than is possible with conventional machines. It is a desire of the present invention to provide a cotton harvesting machine capable of producing cotton modules customized in length. It is an object of the present invention to produce a cotton harvesting machine which reduces the time between harvesting and transport to the cotton gin by eliminating the need for conventional module builders. It is an object of the present invention to provide a cotton harvesting machine capable of continual operation for longer periods of time. It is another object of the present invention to provide a cotton harvesting machine which does not experience the stability problems associated with prior machines when unloading.

Other objects and advantages of the present invention will become apparent to those skilled in the art as a nature of the invention is better understood from the accompanying drawings and a detailed description.

BRIEF DESCRIPTION OF THE DRAWINGS

FIG. 3 is a side elevational view of the present invention as the dividers which separate the first and the second section begin to open up;

FIG. 4 illustrates the first set of hinged doors fully open and the second set of hinged doors acting as a pressure boundary;

FIG. 5 illustrates the cotton module being generated into the third section of the receptacle;

FIG. 6 illustrates the completed module being unloaded by the chain conveyor provided within the receptacle; and FIG. 7 illustrates the variable pitch auger screw of the means for compression.

DETAILED DESCRIPTION OF THE DRAWINGS

Figure 1:
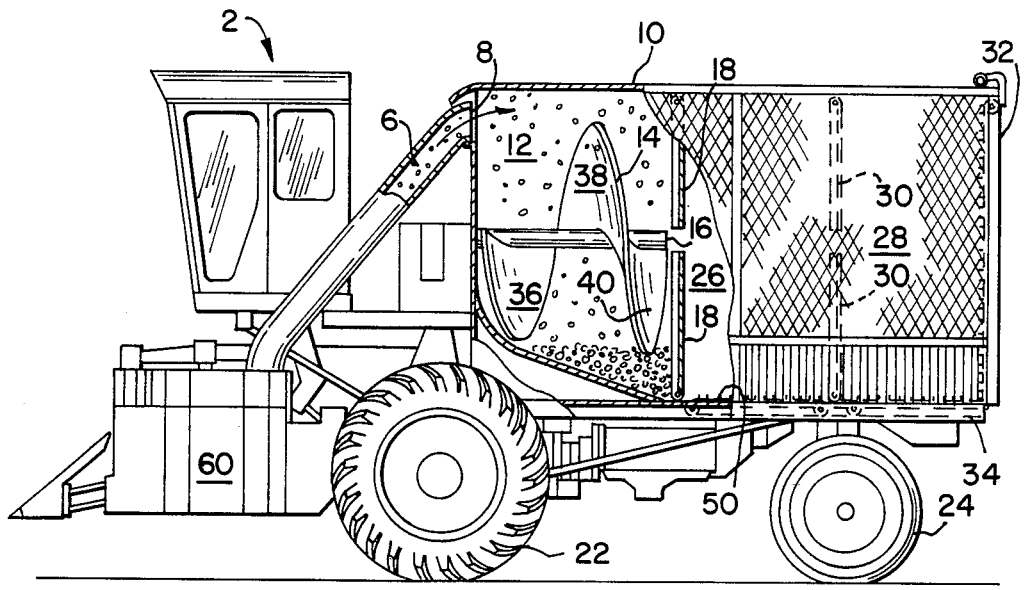
FIG. 1 is a side elevational view of the present invention as the cotton first enters the cotton basket.

Referring to FIG. 1 a mobile cotton harvesting machine 2 is made of a frame 34 supported by wheels 22 and 24 with cotton harvesting means 60 mounted adjacent the ground. After being harvested, cotton is transported by conveyor 6 to receptacle 10 via inlet 8, adjacent the front of the receptacle 10.

The receptacle 10 is divided into three main sections, however, alternative embodiments of the present invention may have an undivided receptacle. The first section 12 is for receiving the cotton. Adjacent the first section is a second section 26. Hinged doors 18 act as dividers separating the first 12 and second 26 sections. Adjacent to the second section 26 is the third section 28. Hinged doors 30 act as dividers separating the second 26 and third sections 28. At the end of the third section is hinged end wall 32. In its first position, the hinged end wall 32 encloses the third section 28 opposite the second section 26 and hinged end wall 32 is coterminous with the rear outlet of receptacle 10. In its second extended position, hinged end wall 32 is capable of projecting horizontally outward to support a cotton module as will be later shown. When unloading, hinged end wall 32 may be completely lowered to the ground.

Mounted within the first section 12 is the means for compression of the cotton into a cotton module. In the embodiment illustrated in FIGS. 1, 2, 3, 4, 5 and 6 the means for compression is an auger screw 14 which rotates along shaft 16. Auger screw 14 also has a variable pitch as illustrated by blade portions 36, 38 and 40 wherein blade portion 38 has a lower pitch than blade portion 36, and blade portion 40 has a lower pitch than blade portion 38. Because of the variable pitch nature of the auger screw 14, the compression of the cotton increases as the cotton flows the direction of crop travel, (towards the receptacle's rear end wall 32). Auger screw 14 may operate as cotton is harvested, or may be programmed to operate only when a predetermined amount of cotton enters the first section of the receptacle, or may be programmed to operate on operator command. The auger screw 14 rotates along shaft 16 in a non-reciprocating manner. Auger screw 14 may also have a plurality of separately axially spaced blades or may be a multiflight auger with a plurality of parallel or nonparallel blades. Alternative embodiments of the auger may have a shaft which is not mounted in the horizontal axis.

Figure 2:
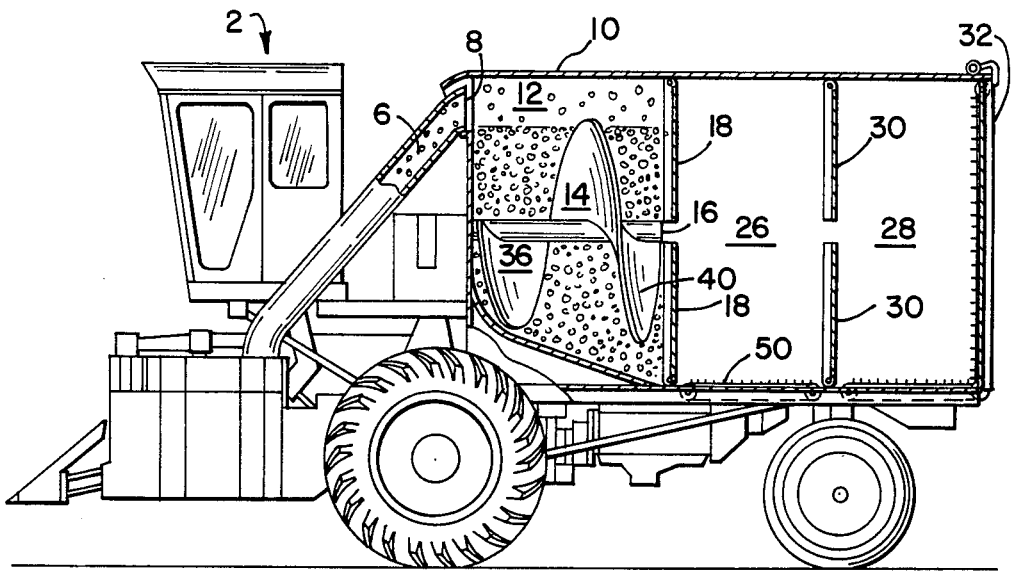
FIG. 2 is a side elevational view of the present invention as the module maker begins rotation for compression.

The cross-sectional area of receptacle 10 is approximately 8×8, thereby producing a cotton module with the same approximate dimensions. The present invention is not limited to 8×8 cotton module, however, 8×8 is the more standard cross-sectional size in the industry. By use of the auger screw 14 cotton modules will usually have a density at least two times that of the cotton as it first enters the first section of the receptacle. FIG. 1 illustrates receptacle 10 as cotton first enters into the first section 12. Closed hinged doors 18 act as a pressure boundary for the forming cotton module. FIG. 2 illustrates the cotton filling up first section 12 as the auger screw 14 is caused to rotate on shaft 16. Hinged doors 18 are held closed until a predetermined force of the cotton module pushes them open. In FIG. 3 hinged doors 18 pivot open, then the cotton module enters second section 26. If desired by the operator, hinged door 18 may be opened at an earlier point in the operation, and hinged doors 30 may be utilized as the initial pressure boundary for the module. FIG. 4 illustrates hinged doors 18 pivoted open while hinged door 30 acts as pressure boundary.

FIG. 5 shows the cotton module being generated into the third section 28 wherein the second set of hinged doors 30 are pivoted open by the force of the cotton module reacting on them. The force at which the second set of hinged doors 30 open is usually preset. FIG. 6 illustrates completion of the cotton module 80. After generation of the cotton module the hinged end wall 32 is lowered to its second position. In the second position hinged end wall 32 is horizontally extended to support the cotton module. Module transfer means 50, typically a chain conveyor system displaces the cotton module from the second and third sections 28 and 26 to a position over extended end wall 32. After the cotton module is transferred, first hinged doors 18 close, allowing auger screw 14 to generate another cotton module and continue the harvesting process.

If the length of modules desired is fixed, the receptacle may be manufactured without the hinged doors to further reduce cost of manufacture. Even without the hinge doors, the cotton harvesting machine may continue to operate while being unloaded. There is no requirement of secondary storage during the unloading operation, nor is there a requirement that the auger screw cease rotating during unloading.

The operations of the first set of hinged doors 18 and the second set of hinged doors 30 and of the hinged end wall 32 may be controlled automatically or may be programmed to operate as the operator desires. When modules of greater length are desired, the hinged end wall 32 is lowered and the second set of hinged doors 30 remain in an open position allowing the cotton module to be generated at an increased length. When it is desired to make cotton modules of shorter length, the second set of hinged doors 30 will be closed after the prior module has been moved to position extending over the hinged end wall. With this control of the hinged doors, cotton modules may be generated in a wide range of lengths. As desired, the hinged end wall 32 may be further extended or a fourth section of the receptacle may be added adjacent to the third section 28 to generate modules of ever increasing length.

If desired, hinged end wall 32 may be lowered to ground level to allow the cotton module to slide down to ground level.

The cotton harvesting machine 2 of the present invention is also advantageous in that it unloads rearwardly. Unloading of the cotton module does not raise the overall center of gravity of the harvesting machine therefore the machine is more stable during unloading.

FIG. 7 illustrates the variable pitch auger screw 14 of the means for compression. The axis of rotation of is shown at 16. Arrow 58 shows the flow direction of the cotton as it is compressed into a module. Blades 36, 38 and 40 illustrate the increasing pitch angle which allows for greater compaction as the cotton flows axially towards the receptacle 10 end wall 32 (FIGS. 1 through 6).

The present invention has been explained in the embodiment of a cotton harvester which can make a self-supporting cotton module. It will be apparent to those skilled in the art that the present invention may be utilized as a cotton harvesting machine with means of compaction in lieu of module making capabilities. Therefore, a repetition of the description is not needed.

While one embodiment of the present invention has been explained which has a nonreciprocal axially rotating means for compression, it will be readily apparent to those skilled in the art of the various modifications which can be made to the present invention without departing from the spirit or scope of this application as encompassed by the following claims.

What is claimed is:

1. A mobile cotton harvesting machine with on board cotton module system comprising:
   a wheeled frame;
   cotton harvesting means mounted on said frame adjacent the ground;
   a receptacle mounted on said frame and having an inlet to receive cotton, said receptacle having a first section for receiving cotton and a second section for receiving the cotton from said first section, said second section separated from said first section by a divider;
   conveyor means to transport the cotton from said harvesting means to said receptacle; and
   means for compression of cotton into a self-supporting cotton module, said means of compression being mounted within said receptacle.

2. An apparatus as recited in claim 1 wherein there are three sections, said third section being adjacent to said second section.

3. An apparatus as recited in claim 1 wherein the divider comprises a first set of hinged doors.

4. An apparatus as recited in claim 3 wherein said first set of hinged doors remain closed until the force of cotton acting on said first set of hinged doors reaches a predetermined level.

5. An apparatus as recited in claim 2 wherein a second set of hinged doors separate said second and third sections and wherein said second set of hinged doors remain closed until the force of cotton acting on said second set of hinged doors reaches a predetermined level.

6. An apparatus as recited in claim 2 wherein said recptacle has mounted therein module transfer means for displacing the cotton module with respect with said receptacle and wherein a hinged end wall encloses said third section opposite said second section in said hinged end wall's first position, and said hinged end wall can be extended from said third section to a second position to support a first cotton module when said module transfer means is displacing the first cotton module from said first and second sections.

7. an apparatus as recited in claim 6 wherein a second cotton module may be generated when said hinged end wall is extended to support the first cotton module.

8. A mobile cotton harvesting machine with on board cotton module system comprising:
   a wheeled frame;
   cotton harvesting means mounted on said frame adjacent the ground;
   a cotton receptacle mounted on said frame, said receptacle having an inlet to receive cotton, a first section, a second section adjacent to said first section, and a third section adjacent to said second section;
   conveyor means to transport the cotton from said harvesting means to said receptacle first section;
   a variable pitch auger screw mounted within said first section for compressing the cotton into a cotton module;
   a first set of hinged doors for separating said first and second sections, said first set of hinged doors being capable of remaining closed until the force of cotton acting on said first set of hinged door reaches a predetermined level;
   a second set of hinged doors for separating said second and third sections, said second set of hinged doors being capable of remaining closed until the force of cotton acting on said second set of hinged doors reaches a predetermined level;
   a hinged end wall, said hinged end wall encloses said third section in a first position and extends from said third section in its second position to support a cotton module; and
   module transfer means for displacing a cotton module from said second and third sections to over said extended hinged end wall.

9. A mobile cotton harvesting machine comprising:
   a wheeled frame;
   cotton harvesting means mounted on said frame adjacent the ground;
   a cotton receptacle mounted on said frame, said receptacle having an inlet to receive cotton, a first section, a second section adjacent to said first section, and a third section adjacent to said second section;
   conveyor means to transport the cotton from said harvesting means to said receptacle first section;
   a variable pitch auger screw mounted within said first section for compacting the cotton;
   a first set of hinged doors for separating said first and second sections, said first set of hinged doors being capable of remaining closed until the force of cotton acting on said first set of hinged door reaches a predetermined level;
   a second set of hinged doors for separating said second and third sections, said second set of hinged doors being capable of remaining closed until the force of cotton acting on said second set of hinged doors reaches a predetermined level;
   a hinged end wall, said hinged end wall encloses said third section; and
   cotton transfer means for displacing the cotton from said receptacle.

* * * * *